United States Patent
Ishihara et al.

(10) Patent No.: US 7,321,789 B2
(45) Date of Patent: Jan. 22, 2008

(54) FOLDING INFORMATION PROCESSOR

(75) Inventors: Yuichi Ishihara, Kumamoto (JP); Junichi Oshiro, Saitama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 135 days.

(21) Appl. No.: 10/563,294

(22) PCT Filed: Jul. 22, 2004

(86) PCT No.: PCT/JP2004/010773

§ 371 (c)(1),
(2), (4) Date: Jan. 3, 2006

(87) PCT Pub. No.: WO2005/009010

PCT Pub. Date: Jan. 27, 2005

(65) Prior Publication Data

US 2006/0229116 A1    Oct. 12, 2006

(30) Foreign Application Priority Data

Jul. 23, 2003    (JP) .............................. 2003-278084

(51) Int. Cl.
*H04M 1/00* (2006.01)

(52) U.S. Cl. .................. 455/575.3; 455/575.1; 455/566; 379/433.06

(58) Field of Classification Search .............. 455/575.3, 455/575.1, 566, 556.2, 90.3; 379/433.06, 379/433.07, 366
See application file for complete search history.

(56) References Cited

U.S. PATENT DOCUMENTS

| 5,436,954 | A  | * | 7/1995  | Nishiyama et al. | 455/566 |
| 5,841,855 | A  | * | 11/1998 | Davidson et al. | 379/396 |
| 6,097,964 | A  | * | 8/2000  | Nuovo et al. | 455/566 |
| 6,460,109 | B1 | * | 10/2002 | Kaply et al. | 710/316 |
| 6,571,086 | B1 | * | 5/2003  | Uusimaki | 455/90.3 |
| 6,792,293 | B1 | * | 9/2004  | Awan et al. | 455/566 |
| 6,811,080 | B1 | * | 11/2004 | Gold et al. | 235/383 |
| 6,907,276 | B2 | * | 6/2005  | Toba | 455/566 |
| 6,941,160 | B2 | * | 9/2005  | Otsuka et al. | 455/566 |
| 7,123,212 | B2 | * | 10/2006 | Acharya et al. | 345/2.1 |
| 7,126,626 | B2 | * | 10/2006 | Sawahara et al. | 348/14.02 |

(Continued)

FOREIGN PATENT DOCUMENTS

JP    2001-333174    11/2001

(Continued)

*Primary Examiner*—Matthew Anderson
*Assistant Examiner*—Minh Dao
(74) *Attorney, Agent, or Firm*—Wenderoth Lind & Ponack, L.L.P.

(57) ABSTRACT

A foldable mobile terminal is capable of carrying out more highly complicated key input such as key input for operating a certain function even in a state in which a housing is closed. This foldable mobile terminal includes a first housing and a second housing connected to each other to be supported so that they can freely be opened/closed. This foldable mobile terminal includes an external display part that can be viewed in a closed state on the first housing or the second housing and a side face key on a side face of the first housing or the second housing. When a soft key icon is displayed on the external display part, the side key is used as a soft key corresponding to the soft key icon.

6 Claims, 10 Drawing Sheets

U.S. PATENT DOCUMENTS

| | | | |
|---|---|---|---|
| 7,212,840 B2* | 5/2007 | Nakamura | 455/567 |
| 2001/0048413 A1* | 12/2001 | Tabata | 345/87 |
| 2002/0058527 A1* | 5/2002 | Kawasaki et al. | 455/550 |
| 2003/0006942 A1* | 1/2003 | Searls et al. | 345/1.1 |
| 2003/0181228 A1* | 9/2003 | Kim | 455/575.3 |
| 2004/0026136 A1* | 2/2004 | Hill et al. | 178/18.01 |
| 2005/0157174 A1* | 7/2005 | Kitamura et al. | 348/207.99 |
| 2005/0190160 A1* | 9/2005 | Wang et al. | 345/168 |
| 2005/0190280 A1* | 9/2005 | Haas et al. | 348/333.05 |
| 2005/0197165 A1* | 9/2005 | Chen | 455/566 |
| 2005/0200726 A1* | 9/2005 | Ito et al. | 348/231.2 |
| 2005/0277438 A1* | 12/2005 | Tilk et al. | 455/556.1 |
| 2006/0063570 A1* | 3/2006 | Nishimura | 455/575.3 |
| 2006/0203124 A1* | 9/2006 | Park et al. | 348/376 |
| 2007/0008239 A1* | 1/2007 | Stroupe et al. | 345/1.1 |

FOREIGN PATENT DOCUMENTS

| | | |
|---|---|---|
| JP | 2002-344610 | 11/2002 |
| JP | 2003-101629 | 4/2003 |
| JP | 2003-110675 | 4/2003 |
| JP | 2003-188960 | 7/2003 |

* cited by examiner

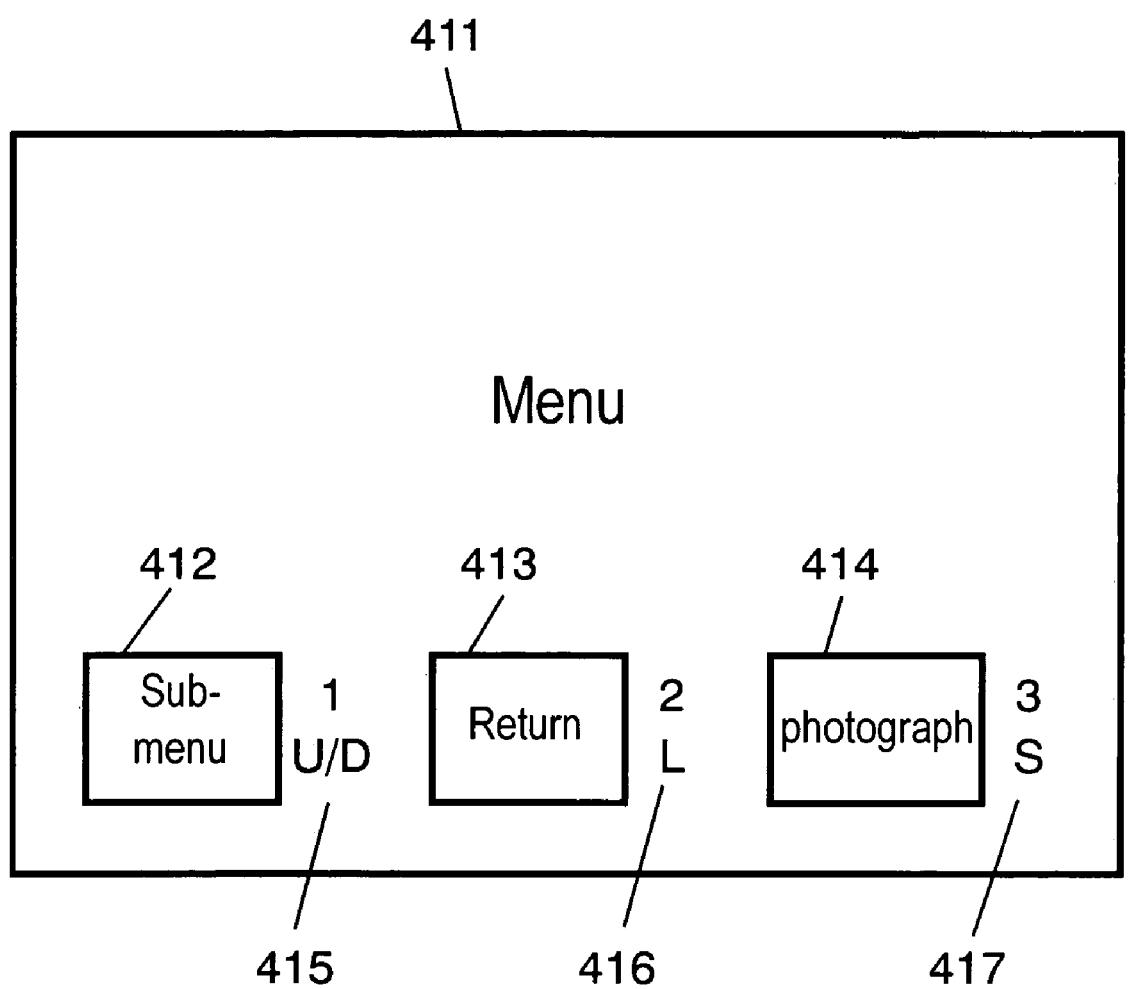

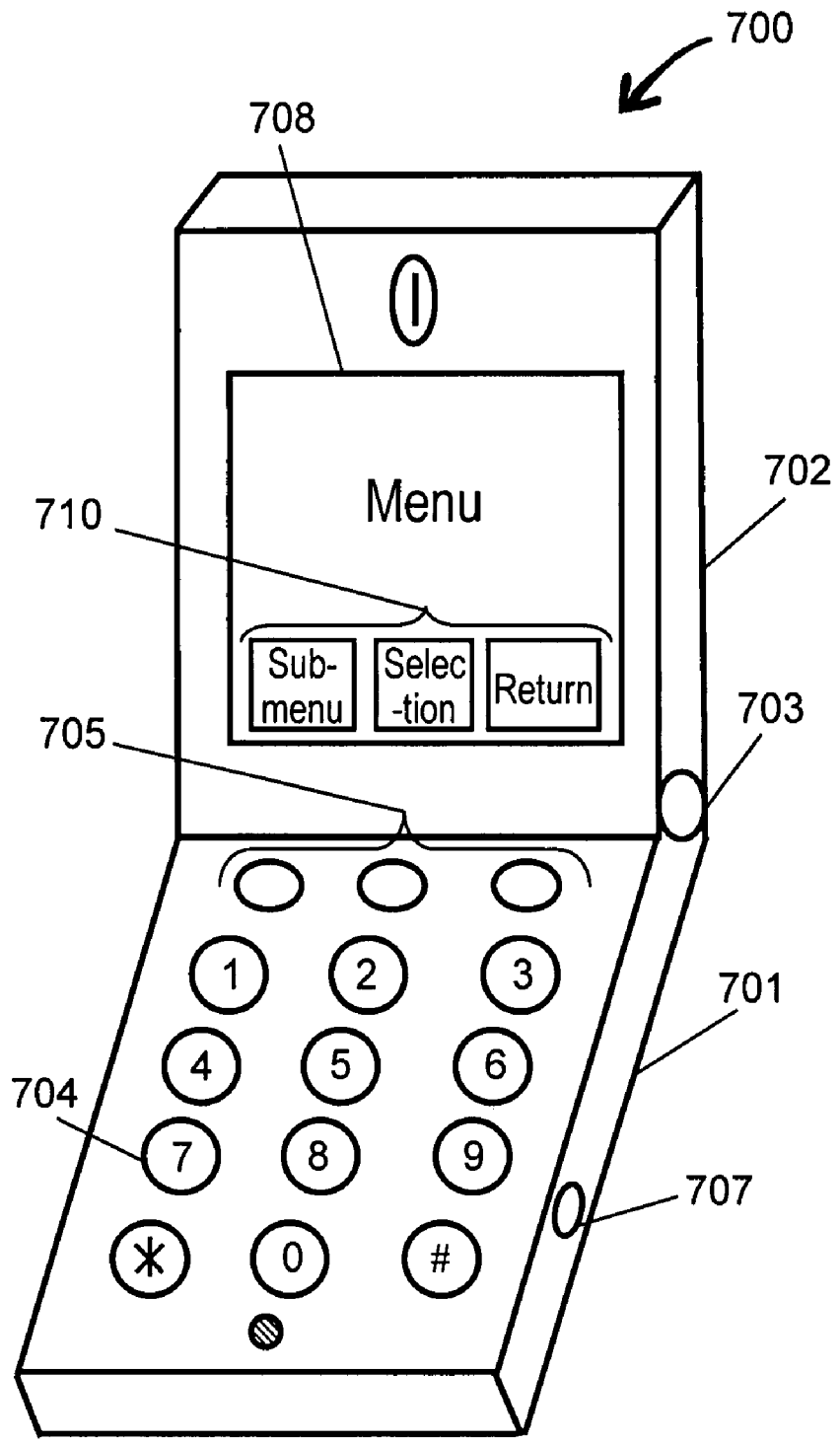
FIG. 10 – PRIOR ART

FIG. 11 - PRIOR ART
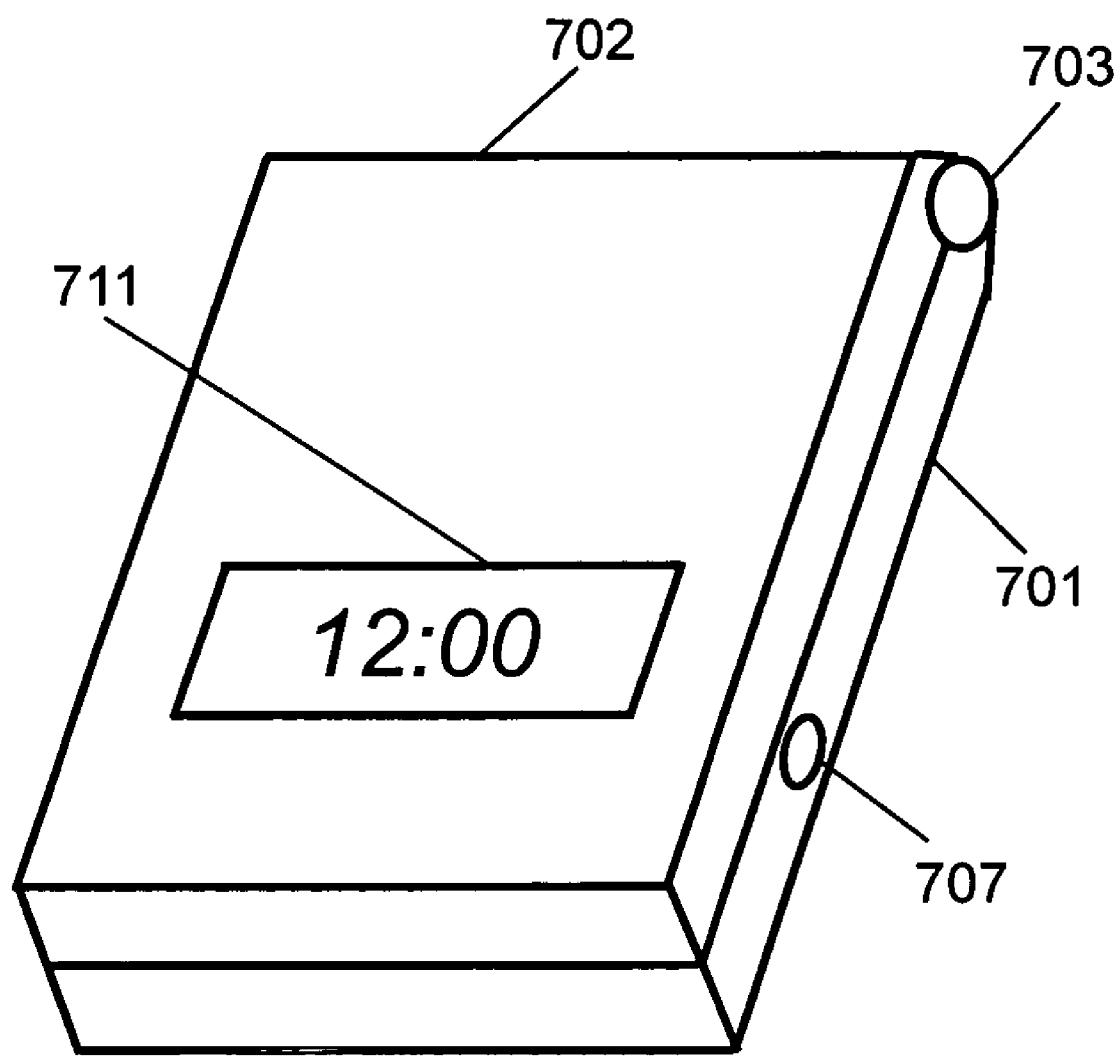

FOLDING INFORMATION PROCESSOR

TECHNICAL FIELD

The present invention relates to a foldable mobile terminal such as a foldable portable telephone device, a notebook computer or a PDA (Personal Digital Assistance), in which a first housing and a second housing are connected to each other to be supported so that they can freely be opened/closed.

BACKGROUND ART

In a conventional foldable mobile terminal such as a foldable portable telephone device, a notebook computer, or the like, a key input part is provided in a first housing, a display part formed of a liquid crystal display device is provided in a second housing, and the second housing is supported with respect to the first housing through a hinge and the like so as to be freely opened/closed. The foldable mobile terminal is used in a state in which the housings are opened at the time of key input, and it can be carried in a state in which the housings are closed when not in use.

FIG. 10 is an external view showing a conventional foldable portable telephone device 700 in a state in which second housing 702 is open. In the conventional foldable portable telephone device 700, first housing 701 and second housing 702 are connected to each other through hinge portion 703 to be supported so that they can freely be opened/closed. First housing 701 includes ten keys 704 for inputting telephone numbers and soft keys 705 in the same plane. Furthermore, first housing 701 has side face key 707 having a plurality of functions, that is, by pushing for a long time, turning on/off power supply, inputting start or end of phone conversation, and further switching displays.

Herein, soft keys 705, which are controlled by a control part (not shown) mounted in the first housing, disposed immediately below soft key icons 710 displayed on display part 708 of the second housing so that soft key icons 710 and soft keys 705 are in one-to-one correspondence. By pushing soft key 705 located nearest to soft key icon 710, a function specified by the soft key icon is allowed to operate.

FIG. 11 is an external view showing the above-mentioned conventional foldable portable telephone device 700 in a state in which second housing 702 is closed. Second display part 711 is provided at the outside of second housing 702 and can display the time, received telephone number, or the like, even in a state in which second housing 702 is closed. Furthermore, by pushing side face key 707 with second housing 702 closed, contents to be displayed on the second display part 711 can be switched. Note here that specific examples of a conventional notebook computer or PDA are not shown but they have substantially the same configuration as mentioned above.

The basic way of using these conventional foldable mobile terminals has been to perform key input in a state in which second housing 702 is open. The use of the conventional foldable mobile terminals in a closed state was limited to watching the displayed time, and the like. Therefore, in a state in which second housing 702 is closed, more highly complicated key input, for example, input for allowing certain functions of the foldable mobile terminal to operate, may not be able to be carried out.

Furthermore, Japanese Patent Unexamined Publication No. 2003-110675 discloses an example of a portable telephone with a slidable lid having a configuration capable of operating soft keys with a lid closed. This portable telephone with a sidable lid is provided with a display part and soft keys on the outer surface of the lid and the lid is allowed to slide on a main body having ten keys. In order to apply this structure to a foldable mobile terminal as shown in FIG. 10 in which second housing 702 is opened/closed by rotating it at a hinge portion, soft keys are added to the outer surface of the second housing 702.

SUMMARY OF THE INVENTION

The present invention provides a foldable mobile terminal capable of carrying out a more highly complicated key input, for example, carrying out input for operating certain functions even in a state in which a housing is closed.

The foldable mobile terminal of the present invention includes an external display part that can be viewed in a closed state and a side face key on a housing of the foldable mobile terminal. When a soft key icon is displayed on the external display part, the side face key is used as a soft key corresponding to the soft key icon.

Furthermore, according to the foldable mobile terminal of the present invention, on the external display part, together with the displayed soft key icon, position information showing a position of the side face key corresponding to the soft key icon is displayed.

Furthermore, according to the foldable mobile terminal of the present invention, a plurality of side face keys are provided, and an entire layout of the side face keys and a position of a corresponding side face key are displayed as position information of the side face key to be displayed on the external display part.

Furthermore, the foldable mobile terminal of the present invention is characterized mainly in that an operation type of the side face key is displayed together with the position information of the side face key to be displayed on the external display part.

Furthermore, in the foldable mobile terminal of the present invention, different display forms are displayed between a soft key to be used by pushing for a long time and a soft key to be used by pushing for a short time as the operation type of the soft key to be displayed on the external display part.

BRIEF DESCRIPTION OF THE DRAWINGS

FIG. 9 is view showing a state in which soft key icons are displayed on an external display part of a foldable portable telephone device in accordance with a fourth exemplary embodiment of the present invention.

FIG. 10 is an external view showing a conventional foldable portable telephone device in an open state.

FIG. 11 is an external view showing the foldable portable telephone device of FIG. 10 in a closed state.

DETAILED DESCRIPTION OF THE PREFERRED EMBODIMENTS

In the present invention, a housing of a foldable mobile terminal includes an external display part that can be viewed in a closed state and side face keys. On the external display part, soft key icons are displayed. The side face keys are used as soft keys corresponding to the soft key icons. Then, on the external display part, together with the soft key icons, position information showing the position of the corresponding side face key is displayed.

Furthermore, the housing includes a plurality of side face keys. The position information of the side face keys is displayed by the entire layout of the side face keys and the positions of the corresponding side face keys. Furthermore, operation types of the side face keys used as the soft keys are also displayed. The soft key used by pushing for a long time and the soft key used by pushing for a short time are displayed in a different way, thus making it easy to grasp the method of operating the side face keys.

First Exemplary Embodiment

Figure 1:
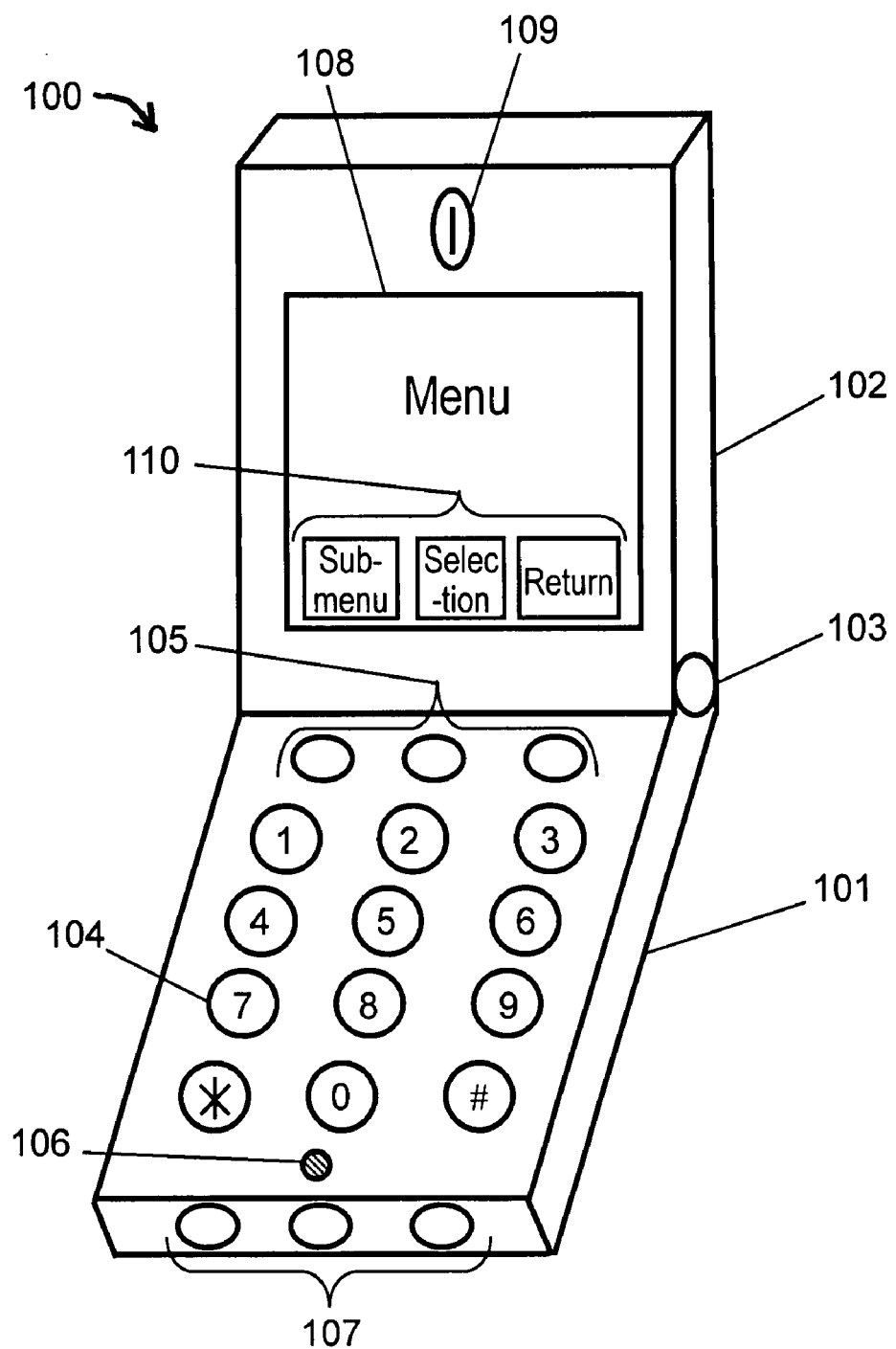
FIG. 1 is an external view showing a foldable portable telephone device in accordance with a first exemplary embodiment of the present invention.

FIG. 1 is an external view showing foldable portable telephone device 100 in a state in which housings are open in accordance with a first exemplary embodiment of the present invention. In the foldable portable telephone device 100, first housing 101 and second housing 102 are connected to each other through hinge portion 103 to be supported so that second housing 102 can freely be opened/closed in the vertical direction with respect to first housing 101.

First housing 101 includes ten keys 104, soft keys 105 and microphone 106 functioning as a telephone transmitter in the same plane. Three side face keys 107 are arranged on a side face at a front of first housing 101. Second housing 102 includes display part 108 formed of a liquid crystal display device and loudspeaker 109 functioning as a telephone receiver.

When a middle side face key of three arranged side face keys 107 is pushed for a time longer than a predetermined time, the power supply of foldable portable telephone device 100 is turned on. When the power supply is turned on, display part 108 displays a menu of functions capable of being operated and soft key icons 110 at the lower part of the menu. When soft key 105 located nearest to each of soft key icons 110 is pushed in a state in which second housing 102 is open, a function corresponding to the displayed soft key icon 110 starts to be operated. Herein, the functions corresponding to soft key icons 110 are any of "submenu", "selection" and "return."

Figure 2:
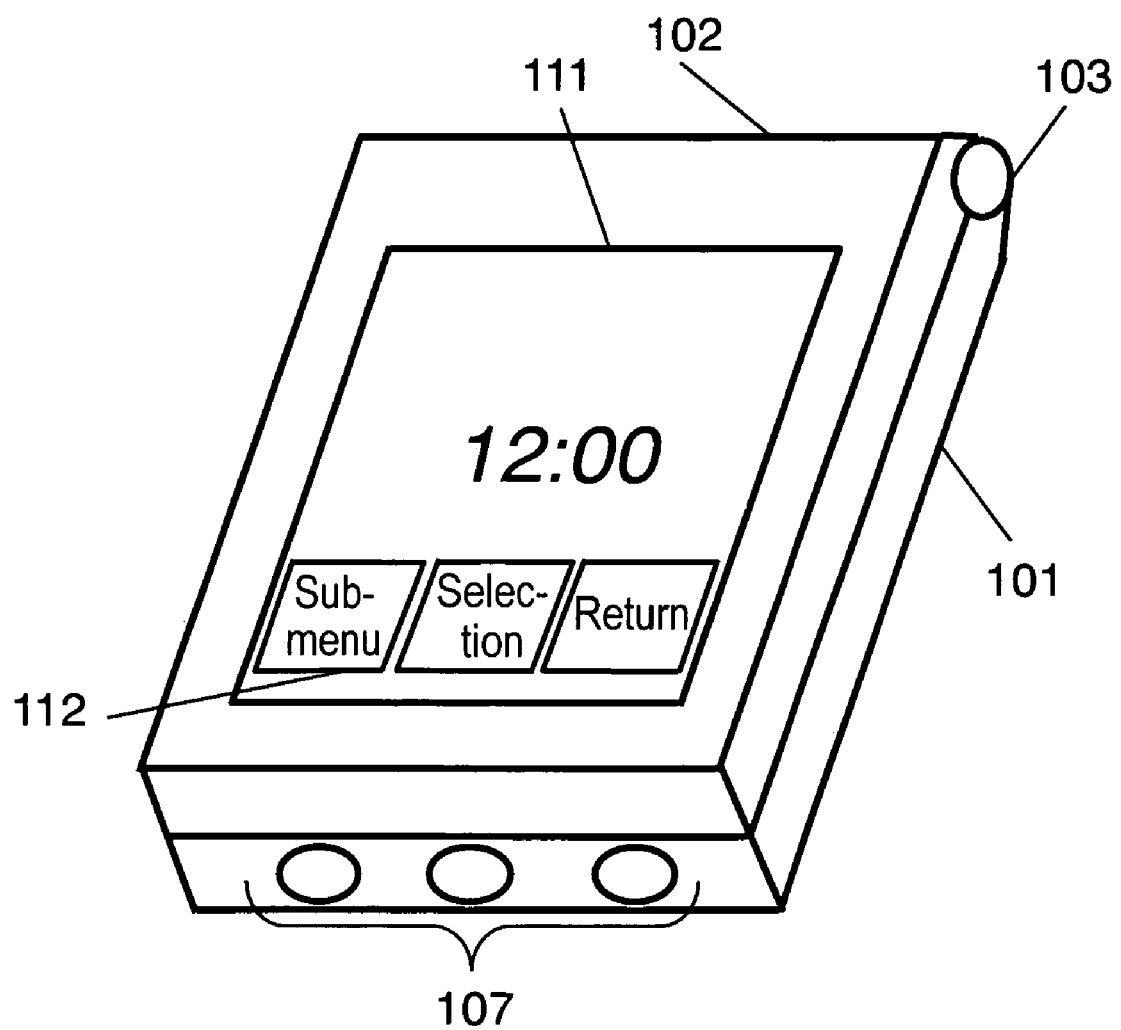
FIG. 2 is an external view showing the foldable portable telephone device according to the first exemplary embodiment.

FIG. 2 is an external view showing foldable portable telephone device 100 when second housing 102 is closed. Second display part 111 that is an external display part is provided on the outer surface of second housing 102. When the power supply of foldable portable telephone device 100 is turned on, second display part 111 displays the time and displays soft key icons 112 below the time.

In a state in which second housing 102 is closed, since soft key icons 112 and side face keys 107 are disposed so that they are in one-to-one correspondence, when side face key 107 located nearest to soft key icon 112 that is intended to be operated is pushed, an operation of the function specified by the pushed soft key icon 112 starts to be operated.

Figure 3:
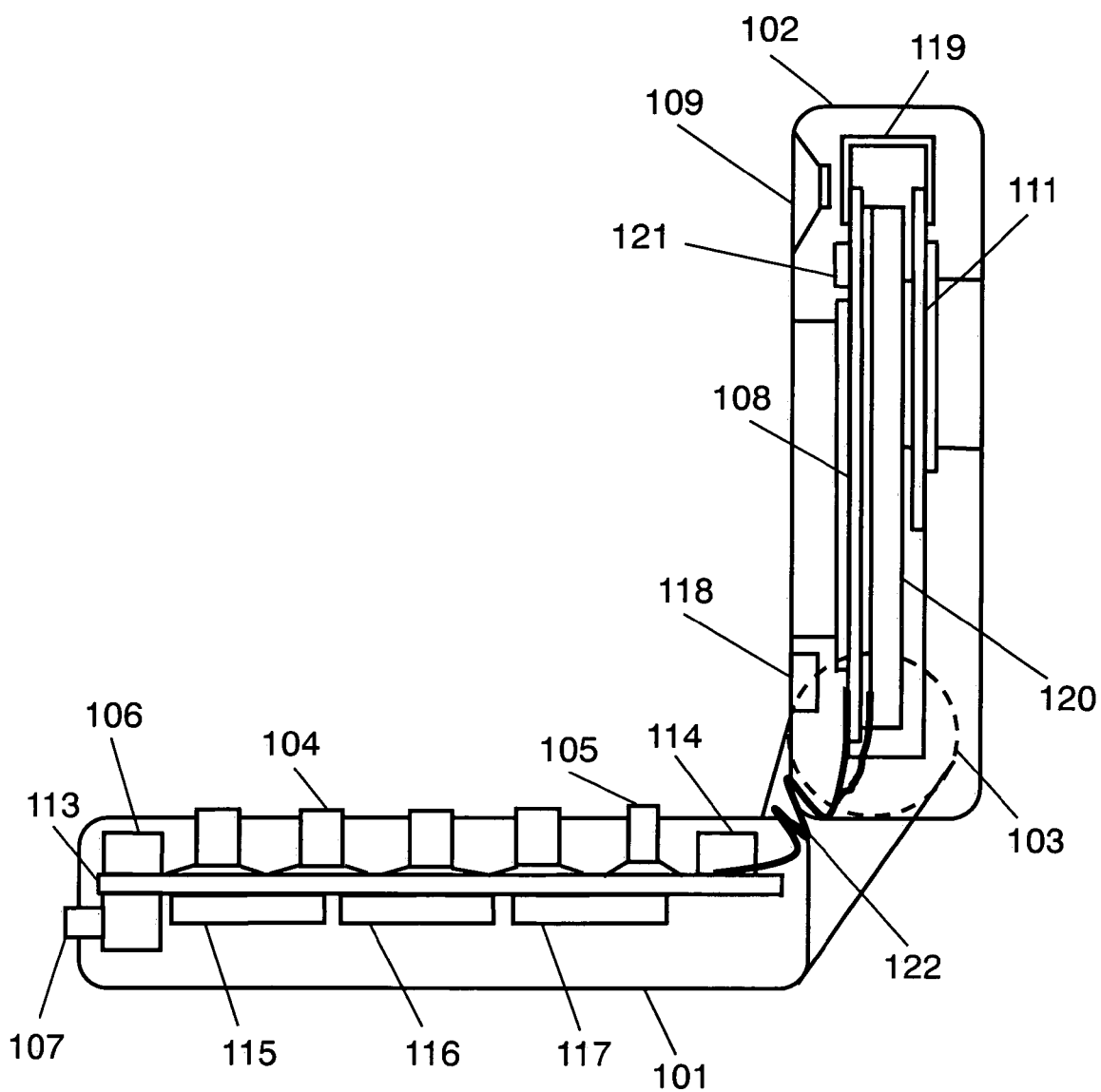
FIG. 3 is a sectional view showing the foldable portable telephone device according to the first exemplary embodiment.

FIG. 3 is a schematic sectional view showing foldable portable telephone device 100 in accordance with the present invention. First housing 101 houses main body substrate 113. Ten keys 104, soft keys 105 and microphone 106 are mounted on main body substrate 113. Furthermore, side face keys 107 are also mounted on main body substrate 113. The respective key input parts are mounted on main body substrate 113 in a concentrated arrangement. Side face keys 107 protrude from the side face of housing 101 and can be pushed from the outside.

Furthermore, opening/closing detection part 114 using a Hall device or the like is mounted on main body substrate 113 and detects that permanent magnet 118 provided in second housing 102 approaches. Furthermore, radio control part 115, entire control part 116, voice processing part 117, and the like, are provided on main body substrate 113, respectively, and realize functions of the portable telephone device.

Second housing 102 includes display part 108, loudspeaker 109 and permanent magnet 118 for detecting opening/closing states at the side facing first housing 101. Furthermore, on the external surface of second housing 102, second display part 111 that is an external display part is provided. Display part 108 and second display part 111 are coupled to each other with rectangular U-shaped flexible printed board 119 and they are disposed with back light 120 sandwiched therebetween.

Driver circuit 121 drives display part 108 and second display part 111. Loudspeaker 109, display part 108, second display part 111 and back light 120 of second housing 102 are connected to main body substrate 113 with flexible substrate 122 whose tip part is divided, and are controlled by entire control part 116 provided on main body substrate 113.

Figure 4:
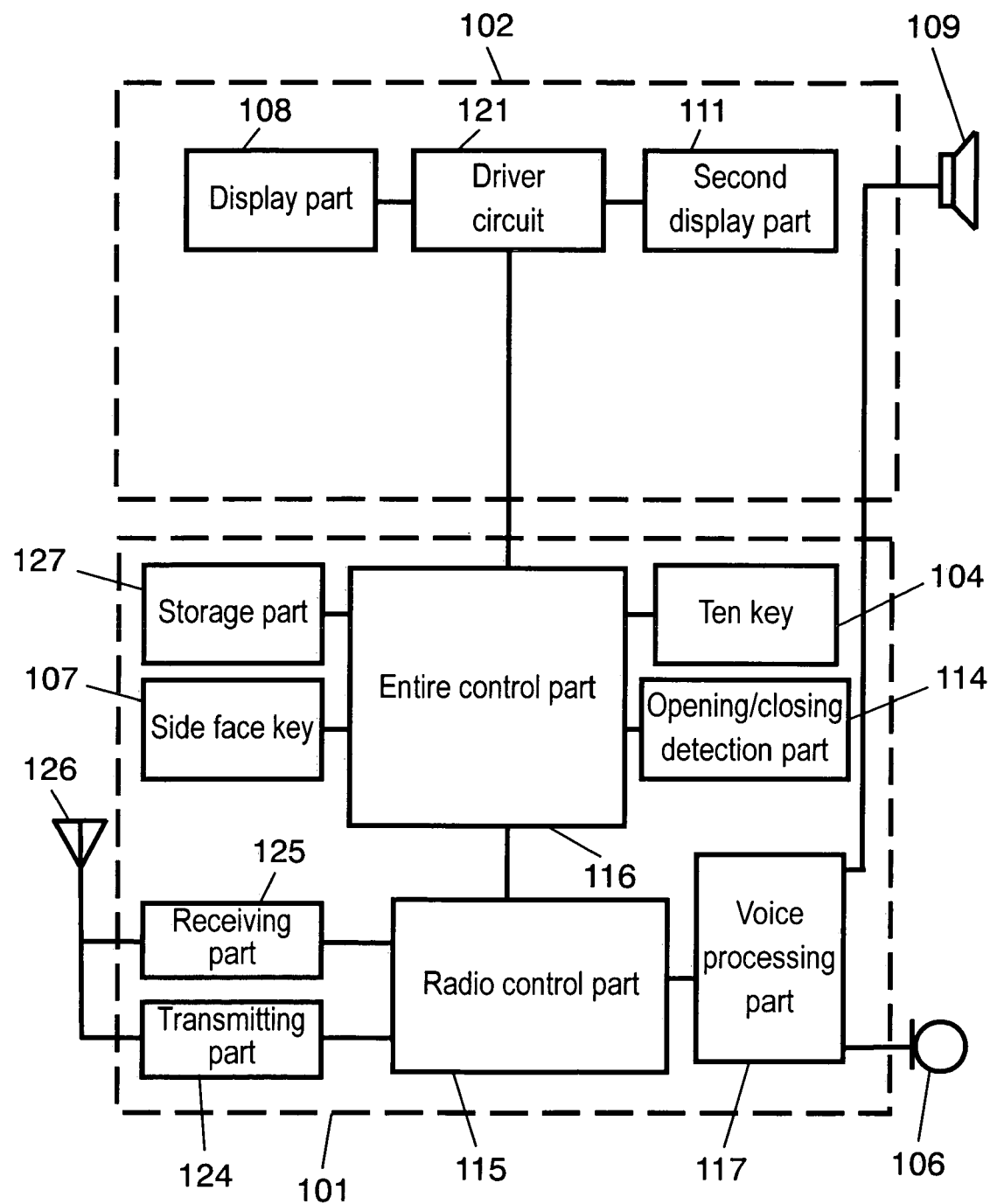
FIG. 4 is a block diagram showing the foldable portable telephone device according to the first exemplary embodiment.

FIG. 4 is a schematic block diagram of foldable portable telephone device 100 in accordance with the present invention. In FIG. 4, first housing 101 and second housing 102 are shown by broken lines, respectively, and each function block housed therein is shown. First housing 101 houses radio control part 115, entire control part 116, voice processing part 117, ten keys 104, side face keys 107, microphone 106, opening/closing state detection part 114 and storage part 127.

Storage part 127 stores various data such as soft keys icons, data of position information of the side face keys, operation type of the side face keys, and the like, in addition to a control program for entire control part 116. When a predetermined side face key 107 is pushed for a time longer than a predetermined time and power from a battery (not shown) is supplied to entire control part 116, entire control part 116 operates radio control part 115, transmits/receives control signals intermittently with respect to a base station of a portable telephone network (not shown) by the use of transmitting part 124, receiving part 125 and antenna 126, and enters into a standby mode for receiving.

When a telephone call is received from another portable telephone device, voice processing part 117 outputs an incoming call sound to loudspeaker 109. When conversation starts, voice processing part 117 transmits voice from microphone 106 and outputs the received voice of a person on the other line from loudspeaker 109.

Second housing 102 houses display part 108 and second display part 111 that is an external display part in a way in which they are coupled to driver circuit 121. Furthermore, second housing 102 houses loudspeaker 109. Entire control part 116 detects an opening/closing state of second housing 102 by opening/closing state detection part 114. Driver circuit 121 displays a menu and soft key icons on display part 108 when second housing 102 is open. Driver circuit 121 displays the time and soft key icons on second display part 111 when second housing 102 is closed.

Figure 5:
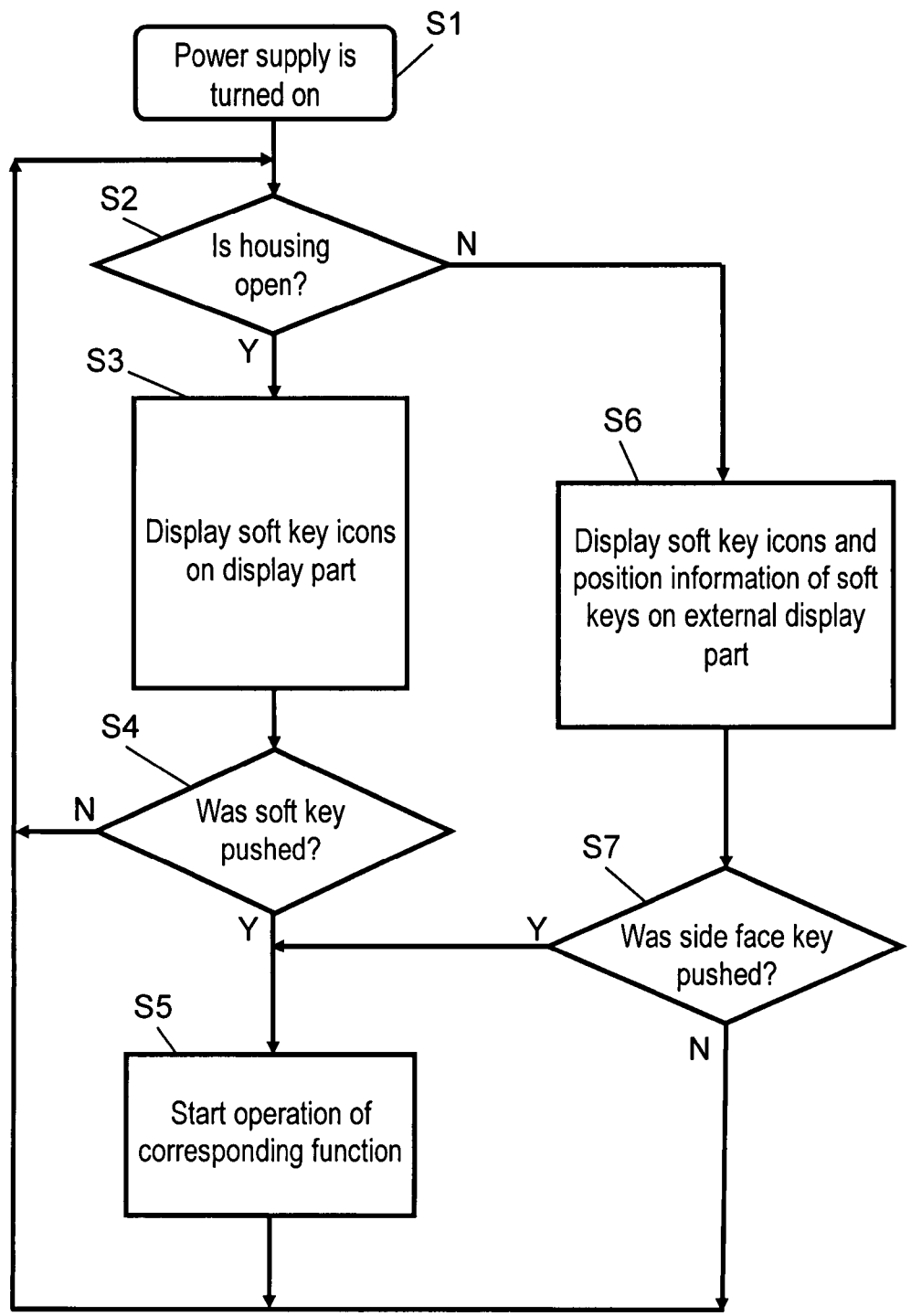
FIG. 5 is a flowchart showing a controlling operation of the foldable portable telephone device according to the first exemplary embodiment.

FIG. 5 is a flowchart showing a controlling procedure based on the opening/closing state of the housing of soft keys in foldable portable telephone device 100 in accordance with the present invention. In FIG. 5, when the power supply of foldable portable telephone device 100 is turned on (Step S1), entire control part 116 detects the opening/closing state of the second housing via opening/closing detection part 114 (Step S2). When second housing 102 is open, a menu showing functions that can be selected are displayed and soft key icons 110 are displayed at the lower part of the menu (Step S3).

Then, when soft key 105 of first housing 101 is pushed (Step S4), an operation of a function shown in soft key icon 110 corresponding to pushed soft key 105 starts (Step S5). When the operation ends, an opening/closing state of second housing 102 is detected. When second housing 102 continues to be open (Step S2), menu and soft key icons 110 are displayed on display part 108 again and the following operations similar to those mentioned above are carried out.

In Step S2 of FIG. 5, when it is detected that second housing 102 is closed, the display on display part 108 is deleted, and the time is displayed on second display part 111 that is an external display part and soft key icons 112 are displayed below the time (Step S6). When side face key 107 is then pushed, an operation of a function shown in soft key icon 112 corresponding to pushed soft key 107 starts (Step S5).

As mentioned above, foldable portable telephone device 100 in accordance with the present invention displays soft key icons 112 on second display part 111 when second housing 102 is closed, and side face keys 107 are used as soft keys. Therefore, when the second housing is closed, it is possible to carry out complicated key input, for example, input for starting an operation of a certain function that could not be carried out in a conventional technique.

Furthermore, since side face keys 107 together with ten keys 104 are mounted on main body substrate 113 in first housing 101 so as to be used as a soft key, unlike the already described Japanese Patent Unexamined Publication No. 2003-110675, it is not necessary that soft keys and a printed board are added to the second housing in addition to key operation parts such as the ten keys in the first housing.

Second Exemplary Embodiment

Figure 6:
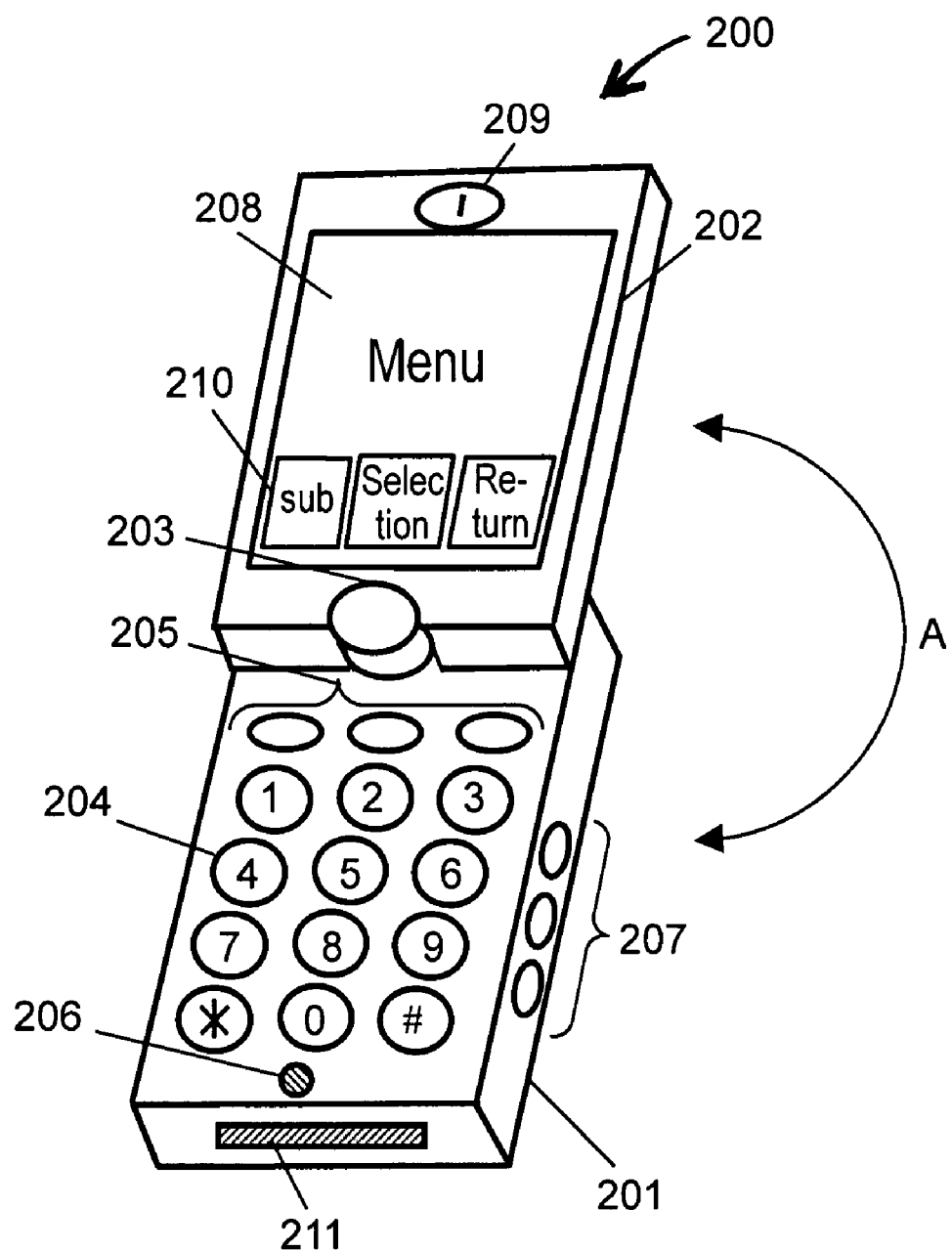
FIG. 6 is an external view showing a foldable portable telephone device in accordance with a second exemplary embodiment of the present invention.

FIG. 6 is an external view showing horizontal rotating type foldable portable telephone device 200 that is a foldable mobile terminal in accordance with a second exemplary embodiment of the present invention. Foldable portable telephone device 200 includes first housing 201 and second housing 202 connected to each other at rotation axis 203. Foldable portable telephone device 200 can be folded by rotating second housing 202 horizontally as shown by an arrow A on first housing 201.

First housing 201 includes ten keys 204, soft keys 205 and microphone 206 in the same plane. On the right side surface of the first housing 201, side face keys 207 are provided. The reason why side face keys 207 are provided on the right side surface of the first housing is that the front side surface of the first housing 201 is provided with connector 211 for charging, so that side face keys 207 cannot be disposed on the front side surface. Second housing 202 includes display part 208 and loudspeaker 209 in the same plane.

When the power supply of foldable portable telephone device 200 is turned on, display part 208 displays a menu of functions that can be selected and displays soft key icons 210 at the lower part of the menu. When soft key 205 of first housing 201 is then pushed, a function corresponding to soft key icon 210 starts to be operated.

Figure 7:
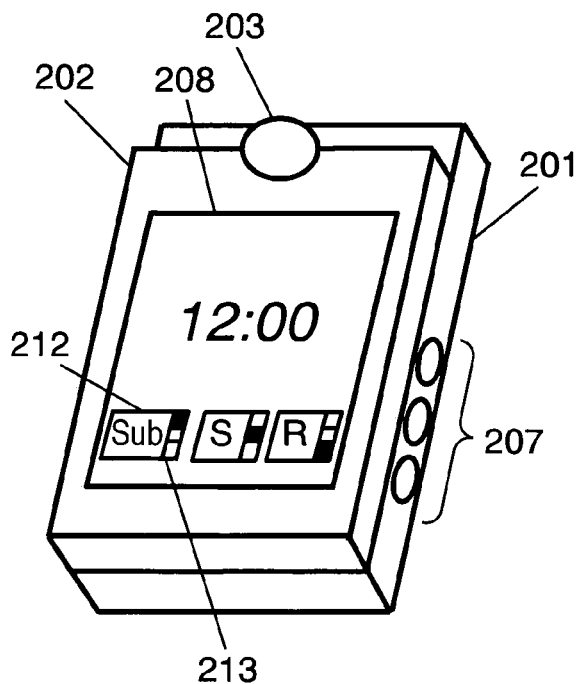
FIG. 7 is an external view showing the foldable portable telephone device according to the second exemplary embodiment.

FIG. 7 is an external view showing foldable portable telephone device 200 in a state in which second housing 202 is rotated horizontally to be folded on first housing 201 in accordance with the second exemplary embodiment of the present invention. Display part 208 of second housing 202 displays the time and soft key icons 212 and displays an entire layout of side face keys 207 and position information 213 of the side face key next to respective soft key icons 212.

Since in foldable portable telephone device 200, three side face keys 207 are arranged in the longitudinal direction on the right side surface of first housing 201, next to each soft key icon 212, three square frames are drawn and the inside of the frame of the position corresponding to side face key 207 is colored in black so as to display position information 213 showing the entire layout of the side face keys and the position of individual side face keys. In FIG. 7, a position display in which an uppermost box of the three square frames is colored in black shows a soft key located at the uppermost part among the three soft keys 207.

A position display in which a middle box of the three square frames is colored in black shows a side face key located in the middle among side face keys 207. A position display in which a bottom box of the three square frames is colored in black shows a side face key located at the bottom among side face keys 207.

In foldable portable telephone device 200, although side face keys 207 are not disposed near soft key icons 212, an operator can operate a soft key without confusion by referring to position information 213 of the side face keys shown next to soft key icons 212. When the operator pushes side face key 207 of first housing 201, a certain operation of the function of the soft key icon corresponding to the pushed side face key starts.

Third Exemplary Embodiment

Figure 8:
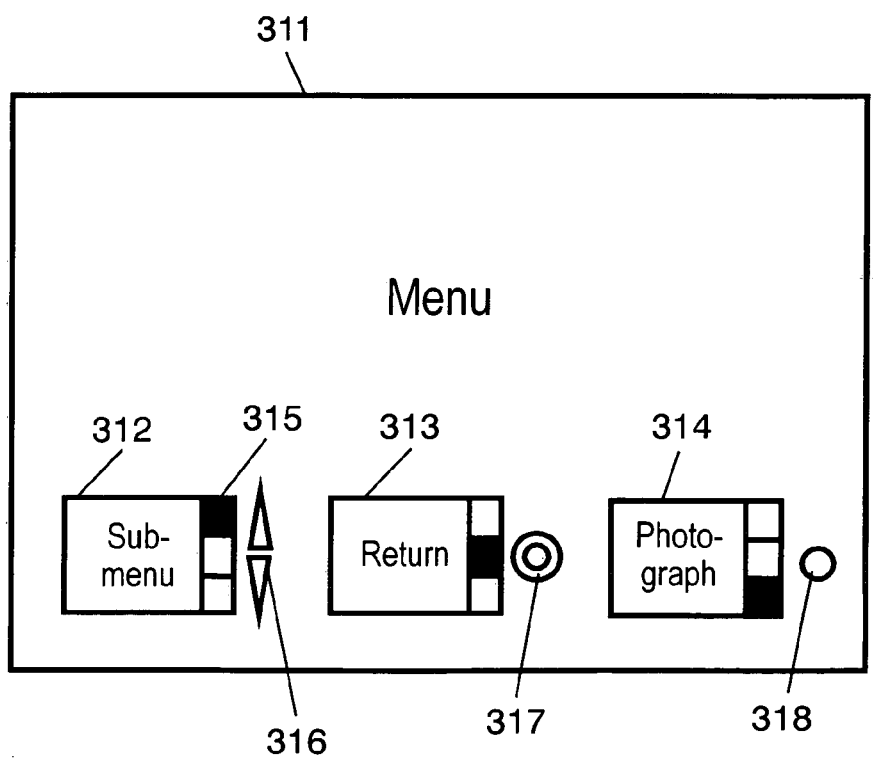
FIG. 8 is view showing a state in which soft key icons are displayed on an external display part of a foldable portable telephone device in accordance with a third exemplary embodiment of the present invention.

FIG. 8 is a view showing a state in which soft key icons, position information and operation types of side face keys are displayed on second display part 311 of a foldable portable telephone device in accordance with a third exemplary embodiment of the present invention. FIG. 8 shows three soft key icons 312, 313 and 314 and next to each soft key icon, three frames showing an entire layout of the soft keys and position information 315 in which the position of the corresponding side face key is colored in black.

Then, next to the soft key icons, upward and downward arrow 316, double circle (◎) 317 and circle 318 (○) are shown, respectively, which show operation types of the soft keys. Herein, upward and downward arrow 316 means that the side face key corresponding to soft key icon 312 is a key to be moved upwardly and downwardly. Double circle 317 means that the side face key corresponding to soft key icon 313 is a key to be pushed for a time longer than a predetermined time, and circle 318 means that the side face key corresponding to soft key icons 314 is a key to be pushed only for a short time. Since the operation types of the side face keys are displayed in this way, an operator can obtain information on how to operate the side face key that serves as soft keys and can carry out soft key input without confusion.

In FIG. 8, for description, position information and operation types of side face keys are displayed by different drawings, respectively. However, position information and operation types may be displayed by one drawing with different colors by the use of drawings and colors in a way in which a corresponding box of the position information is colored in red to show a long-duration push key and a corresponding box of the position information is colored in black to show a short-duration push key.

Fourth Exemplary Embodiment

FIG. 9 is a view showing a state in which soft key icons and position information are displayed on second display part 411 of a foldable portable telephone device in accordance with a fourth exemplary embodiment of the present invention. In the fourth exemplary embodiment, positions of the side face keys used as soft keys are shown by numerical references instead of figures. In the upper portions at the right side of soft key icons 412, 413 and 414, numerical references "1", "2" and "3" showing the positions of the soft keys are displayed, respectively. In the lower portions, abbreviations showing operation types of the keys are displayed, respectively.

In FIG. 9, "U/D" means up/down and means an operation of moving upward and downward, "L" means an operation of pushing for a time longer than a predetermined time and "S" means an operation of pushing for only a short time. An operator can read soft key icons, position information and operation types in a state in which the second housing is closed and can carry out soft key input without confusion.

Note here that display of position information or operation type is not limited to the above-mentioned examples, and other icons, picture writings, and the like, may be used or black dots may be provided. Furthermore, the method of folding the foldable mobile terminal may be folding methods other than those shown in the above exemplary embodiments, for example, a method in which a second housing slides in the vertical direction on a first housing.

As mentioned above, the foldable mobile terminal in accordance with the present invention shows position information of side face keys corresponding to soft key icons together with the soft key icons. Therefore, even when the side face keys are not located in the immediate vicinity of the soft key icons, by the position information of the side face keys, an entire layout of the side face keys and positions of the corresponding side face keys can be grasped intuitively. Thus, it is possible to reliably operate soft keys also in a case where a housing is folded.

INDUSTRIAL APPLICABILITY

As mentioned above, the present invention can be applied to a foldable mobile terminal such as a foldable portable telephone device, a notebook computer, a PDA, or the like capable of carrying out complicated key input to some extent by using side face keys even in a state in which a housing is closed.

Furthermore, the present invention can be applied to a foldable mobile terminal in which side face keys are not disposed in the immediate vicinity of displayed soft key icons.

Furthermore, the present invention can be applied to a foldable mobile terminal in which operation types of the soft keys are different from each other, for example, a long-duration push key and a short-duration push key are mixed.

The invention claimed is:

1. A foldable mobile terminal comprising a first housing and a second housing connected to each other to be supported so that they can freely be opened/closed, comprising:
    an external display part that can be viewed in a closed state on the first housing or the second housing; and
    a side face key on a side face of the first housing or the second housing,
    wherein when a soft key icon is displayed on the external display part, the side face key is used as a soft key corresponding to the soft key icon, and
    wherein on the external display part, together with the displayed soft key icon, position information showing a position of the side face key corresponding to the soft key icon is displayed.

2. The foldable mobile terminal according to claim 1, wherein
    the side face key is one of a plurality of side face keys provided on the first housing or the second housing; and
    for each of said side face keys, an entire layout of the side face keys and a position of the side face key are displayed as position information of the side face key to be displayed on the external display part.

3. The foldable mobile terminal according to claim 2, wherein
    for each of said side face keys, an operation type of the side face key is displayed together with the position information of the side face key to be displayed on the external display part.

4. The foldable mobile terminal according to claim 3, wherein
    a first one of said side face keys constitutes a soft key to be used by pushing for a long time, and a second one of said side face keys constitutes a soft key to be used by pushing for a short time; and
    a display form displayed on the external display part as the operation type for said first one of said side face keys is different than a display form displayed on the external display part as the operation type for said second one of said side face keys.

5. The foldable mobile terminal according to claim 1, wherein an operation type of the side face key is displayed together with the position information of the side face key to be displayed on the external display part.

6. The foldable mobile terminal according to claim 5, wherein a display form displayed on the external display part as the operation type of the soft key is a display form indicating that the soft key is one of a soft key to be used by pushing for a long time and a soft key to be used by pushing for a short time.

* * * * *